United States Patent Office 3,740,405
Patented June 19, 1973

3,740,405
N-SUBSTITUTED [2-(2-PHENYLBICYCLO-(2,2,1)-HEPTYL)]-CARBAMATES
Helmut Kraft, Neckarhausen, Germany, assignor to Knoll A.G. Chemische Fabriken, Ludwigshafen (Rhine), Germany
No Drawing. Filed Nov. 24, 1970, Ser. No. 92,517
Claims priority, application Germany, Nov. 26, 1969,
P 19 59 365.8
Int. Cl. C07d 39/06
U.S. Cl. 260—293.53        9 Claims

ABSTRACT OF THE DISCLOSURE

Spasmolytic and broncholytic N-substituted [2-(2-phenylbicyclo-(2,2,1)-heptyl]-carbamates of the formula

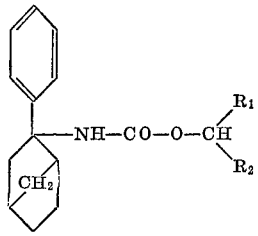

and acid addition and quaternary ammonium sulfate salts thereof; the method of making said carbamates by reaction of 2-phenylbicyclo-(2,2,1)-heptane-2-carbonic acid chloride with an alkali metal azide, conversion to the corresponding isocyanate by loss of nitrogen, and reaction of the isocyanate with an amino alcohol.

---

The present invention relates to N-[2-(2-phenylbicyclo-(2,2,1)-heptyl)]-carbamates and to methods of making the same.

More in particular, the present invention relates to carbamates of the general formula

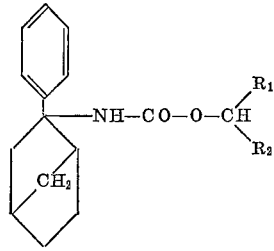

to their salts formed with physiologically compatible acids, and to their quaternary ammonium compounds, wherein $R_1$, taken alone, is

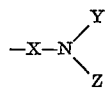

X represents methylene or ethylene; Y and Z, taken alone, are the same or different and represent lower alkyl or arylalkyl or, taken together, form an alkylene residue; $R_2$, taken alone, represents hydrogen or methyl; and wherein $R_1$ and $R_2$, taken together with the carbon atom to which they are attached, form a heterocyclic residue having 1 or 2 tertiary nitrogen atoms.

Furthermore, the present invention also relates to a process for the preparation of such carbamates wherein 2-phenylbicyclo-(2,2,1)-heptane-2-carbonic acid chloride is reacted with an alkali metal azide such as potassium azide, preferably sodium azide, the azide so formed losing nitrogen to form the isocyanate, which is then reacted with an amino alcohol of the formula

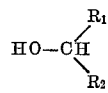

wherein $R_1$ and $R_2$ have the meaning given above.

Carbamates are formed in accordance with the illustrative reaction scheme shown below:

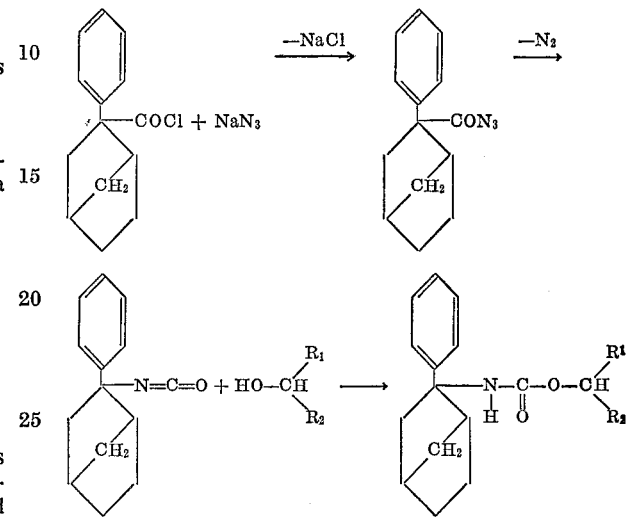

2-dimethylamino ethanol, 3-dimethylaminopropanol or 3-diethylaminopropanol, 2-(4 - methyl-piperazino)-ethanol, N-methyl-3-piperidinol, N-methyl-4-piperidinol, N-benzyl-4-piperidinol, tropine, or chinuclidol-3 may, for example, be employed as suitable amino alcohols of the formula

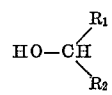

In the first step of the reaction, the alkali metal azide and the acid chloride are heated together in an inert aprotic organic solvent such as benzene, toluene or xylene to the boiling point of the solvent (e.g., 50° C.–200° C.), thus forming the azide. By such heating at an elevated temperature, a molecule of nitrogen is lost and the azide is converted into the isocyanate. The latter need not be isolated but is immediately reacted with a suitable amino alcohol either at room temperature or at an elevated temperature such as at the boiling point of the solvent (e.g., up to about 200° C.). The reaction is completed in three to five hours. The carbamates are isolated by distilling off the solvent and may be converted into their salts by reaction with physiologically compatible acids, e.g. by contacting the reagents in an inert solvent. Hydrochloric acid, sulfuric acid, phosphoric acid, lactic acid, tartaric acid, maleic acid, fumaric acid and citric acid are all examples of physiologically compatible acids.

The quaternary ammonium compounds may be produced by reacting the carbamates with suitable compounds such as a di-lower alkyl sulfate, preferably dimethyl sulfate or diethyl sulfate, for example by contacting the reagents in an inert solvent at room temperature or at an elevated temperature.

These new substances occur in two isomeric forms. The phenyl residue and the bicycloheptyl residue can assume either a cis- or trans-position relative to the methyl bridge of the bicycloheptyl residue. The cis-position isomer is hereinafter referred to as the endo-form, and the trans-position is hereinafter referred to as the exo-form. The new substances may be produced pure in both forms. If no reference is made to the form, mixtures of endo- and exo-form are concerned.

The substances in accordance with the present invention exhibit high spasmolytic, anti-colinergic, broncholytic, and nicotinolytic properties and can be used for therapeutic purposes.

Table 1 shows, by way of example, the broncholytic effect of some of the new substances. The broncholytic effect was determined on guinea pigs which suffered from bronchial spasms induced by the administration of acetylcholine according to the method of H. Konzett et al., Naun-Schmiedeberg's Arch. exp. Path. Pharmak. 195, 71 (1940). The active agents were administered intravenously.

TABLE 1

| Substance: | Broncholytic effect $ED_{50}$ (mg./kg.) |
|---|---|
| 4 - dihydrotropidyl-N-[2-(2 - phenylbicyclo-(2,2,1)-heptyl)]-carbamate-methylsulfate | 0.001 |
| N - methyl - 4 - piperidyl-N-[2-(2-phenylbicyclo - (2,2,1)-heptyl] - carbamate-methylsulfate | 0.005 |
| 3 - chinuclidyl-N-[2-(2-phenylbicyclo-(2,2,1)-heptyl)]-carbamate | 0.006 |
| 3 - chinuclidyl-N-[2-(2-phenylbicyclo(2,2,1)-heptyl]-carbamate·HCl | 0.006 |
| 3 - chinuclidyl-N-[2-(2-phenylbicyclo(2,2,1)-heptyl)]-carbamate-methylsulfate | 0.006 |
| Scopolamine-N-butylhydroxide (corparison substance) | 0.05 |

Table 2 shows the quantities of active substances in accordance with the present invention which completely cure a nicotine-induced cramp in the isolated ileum of a guinea pig according to the method of R. Magnus, Pflueger's Arch. ges. Physiol. 102, 123 (1904).

TABLE 2

| Substance: | Active substance quantity, µg./ml. |
|---|---|
| 4-dihydrotropidyl - N - [2 - (2 - phenylbicyclo-(2,2,1)-heptyl)]-carbamate-methylsulfate | 10 |
| N-methyl - 4 - piperidyl - N - [2 - (2 - phenylbicyclo - (2,2,1) - heptyl)] - carbamate-methylsulfate | 10 |
| N-methyl - 4 - piperidyl - N - [2 - (2 - phenylbicyclo-(2,2,1)-heptyl)]-carbamate | 10 |
| N-methyl - 4 - piperidyl - N - [2 - (2 - phenylbicyclo - (2,2,1) - heptyl)]-carbamate (endo-form) | 5 |
| N-methyl - 4 - piperidyl - N - [2-(2-phenylbicyclo - (2,2,1) - heptyl)] - carbamate (exo-form) | 5 |
| 3-chinuclidyl - N - [2-(2-phenylbicyclo - (2,2,1)-heptyl)]-carbamate | 10 |
| 3-chinuclidyl - N - [2 - (2 - phenylbicyclo-(2,2,1)-heptyl)]-carbamate-methylsulfate | 5 |
| scopolamine - N - butylhydroxide (comparison substance) | 100 |

The new substances are administered orally or parenterally in doses of about 0.05 to 0.5 mg./kg. per day, suitably in combination with an inert physiologically acceptable solid or liquid carrier. Tablets and coated pills are particularly suitable for oral administration, while sterilized solutions may be used for parenteral administration, e.g., intravenous injection.

The invention will be further described by way of the following non-limitative examples.

EXAMPLE 1

2-dimethylaminoethyl-N-[2-(2-phenylbicyclo-(2,2,1)-heptyl)]-carbamate

A mixture of 2-phenylbicyclo-(2,2,1)-heptane-2-carbonic acid chloride (23.5 g.:0.1 mol), sodium azide (7.2 g.:0.11 mol), and anhydrous toluene (100 ml.) is boiled under reflux for 20 hours. The precipitated salts are filtered off and 2-dimethylaminoethanol (9.8 g.:0.11 mol) is added to the toluene filtrate. This mixture is then boiled under reflux for five hours. A small amount of a crystalline precipitate is filtered off and the solvent is evaporated under reduced pressure. The oily residue is then distilled. The 2-dimethylaminoethyl - N - [2 - (2 - phenyl-bicyclo-(2,2,1)-heptyl)]-carbamate $C_{18}H_{26}N_2O_2$ forms a colorless oil distilling at 159–164° C. and 0.2 mm. Hg. A yield of 22 g. representing 73% of the theory is obtained. Its hydrochloride has a melting point of 166°–168° C. when recrystallized from methylethyl ketone.

In a similar manner, the following carbamates are obtained by reacting the isocyanates formed from 2-phenylbicyclo-(2,2,1)-heptane-2-carbonic acid chloride with suitable tertiary aminoalcohols:

| Tertiary aminoalcohol | Product |
|---|---|
| 3-diethylaminopropanol-1 | 3-diethylaminopropyl-N-[2-(2-phenylbicyclo-(2,2,1)-heptyl)]-carbamate. B.P.=159–169° C./0.01 torr. 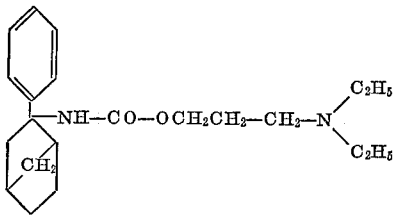 |
| 2-(4-methyl-piperazino) ethanol. | 2-(4-methylpiperazinoethyl)-N-[2-(2-phenylbicyclo-(2,2,1)-heptyl)]-carbamate. B.P.=140–145° C./0.4 torr 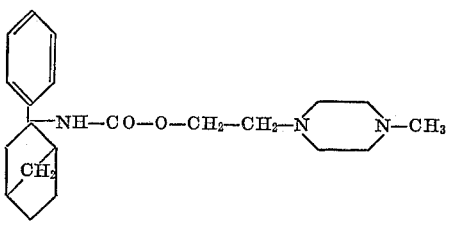 |

TABLE—Continued

| Tertiary aminoalcohol | Product |
|---|---|
| N-methyl-3-piperidinol | N-methyl-3-piperidyl-N-[2-(2-phenylbicyclo-(2,2,1)-heptyl)]B.P.=186–196° C./0.01 torr. |

$$\text{Ph}_2(\text{CH}_2\text{-C}_6\text{H}_5)\text{C—NH—CO—O—(piperidyl-N-CH}_3)$$

| N-methyl-4-piperidinol | N-methyl-4-piperidyl-N-[2-(2-phenylbicyclo-(2,2,1)-heptyl)]-B.P.=186–190° C./0.1 torr. |

$$\text{Ph}(\text{CH}_2\text{-C}_6\text{H}_5)\text{C—NH—CO—O—(4-piperidyl N-CH}_3)$$

| N-benzyl-4-piperidinol | N-benzyl-4-piperidyl-N-[2-(2-phenylbicyclo-(2,2,1)-heptyl)]-carbamate. B.P.=200–212° C./0.05 torr. |

$$\text{Ph}(\text{CH}_2\text{-C}_6\text{H}_5)\text{C—NH—CO—O—(4-piperidyl N-CH}_2\text{-C}_6\text{H}_5)$$

| Tropine | 4-dihydrotropidyl-N-[2-(2-phenylbicyclo-(2,2,1)-heptyl)]-carbamate. B.P.=200–205° C./0.1 torr. |

$$\text{Ph}(\text{CH}_2\text{-C}_6\text{H}_5)\text{C—NH—CO—O—(tropidyl N—CH}_3)$$

| Chinuclidol-3 | 3-chinuclidyl-N-[2-(2-phenylbicyclo-(2,2,1)-hepthl)]-carbamate. |

$$\text{Ph}(\text{CH}_2\text{-C}_6\text{H}_5)\text{C—NH—CO—O—(chinuclidyl)}$$

EXAMPLE 2

4-dihydrotropidyl-N-[2-(2-phenylbicyclo-(2,2,1)-heptyl)-carbamate-methylsulfate 2.6 g. of dimethylsulfate is added, while cooling, to a solution of 4-dihydrotropidyl-N-[2 - (2 - phenylbicyclo-(2,2,1)-heptyl)]-carbamate (7.1 g.), obtained in accordance with Example 1, in ethyl acetate (5 ml.). After a short period, the methylsulfate crystallizes out. M.P. 201–202° C. (recrystallized from methylethylketone). Yield 8.0 g. (representing 83% of the theoretical yield).

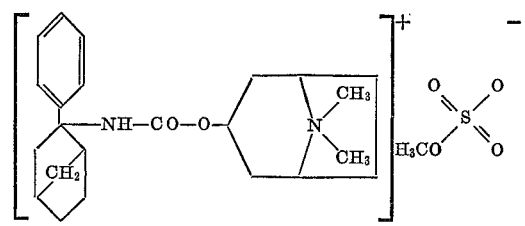

Similarly, the following can be obtained:

(1) N-methyl - 4 - piperidyl - N - [2 - (2 - phenylbicyclo-(2,2,1)-heptyl)]-carbamate-methylsulfate
M.P.=100–110° C. (hygroscopic)
Yield: 77% of the theoretical yield (2) 3-chinuclidyl-N-[2-(2-phenylbicyclo-(2,2,1)-heptyl)]-carbamate-methylsulfate
M.P.=190–200° C. (hydroscopic)
Yield: 74% of the theoretical yield

EXAMPLE 3

The compounds produced in accordance with Examples 1 and 2 are mixtures of the endo- and exo-forms. If the compounds are to be produced pure in one isomeric form, then the corresponding endo- or exo-form of the 2-phenylbicyclo-(2,2,1)-heptane-2-carbonic acid chloride must be used as a starting material. In this way, the following compounds are obtained in a manner analogous to that described in Example 1.

(1). N - methyl-4-piperidyl-N-[2-(2-phenylbicyclo(2,2,1)-heptyl)]-carbamate
M.P.=178° C. (as the oxalate, recrystallized from an ethanol-diethylether mixture); exo-form
(2). N - methyl-4-piperidyl-N-[2-(2-phenylbicyclo-(2,2,1) heptyl)]-carbamate
M.P.=137° C. (as the oxalate, recrystallized from an ethanol-diethylether mixture); endo-form
(3). 4 - dihydrotropidyl - N - [2-(2-phenylbicyclo-(2,2,1)-heptyl)]-carbamate
M.P.=157–148° C. (as the free base, recrystallized from ethyl acetate)
M.P.=292° C. (as the hydrochloride, recrystallized from an ethanol-diethylether mixture); endo-form
(4). 4 - dihydrotropidyl - N - [2-(2-phenylbicyclo-(2,2,1)-heptyl)]-carbamate
M.P.=147–148° C. (as the free base recrystallized from diisopropylether
M.P.=263° C. (as the hydrochloride, recrystallized from ethanol-diethylether mixture); exo-form

EXAMPLE 4

Coated tablets of the following composition are produced in a conventional manner from the following:

0.30 mg. 4-dihydrotropidyl-N-[2-(2-phenylbicyclo-(2,2,1) heptyl)]-carbamate;
50.00 mg. excipient
49.90 mg. coating The excipient consists of 9 parts (by weight) of maize starch, 3 parts of lactose, and 1 part of "Luviskol VA 64" (vinylpyrrolidone-vinyl acetate-mixed polymerizate 60:40, see Pharm. Ind. 1962, 586). The coating consists of 5 parts (by weight) of crude sugar, 2 parts of maize starch, 2 parts of calcium carbonate and 1 part of talcum.

EXAMPLE 5

3 - chinuclidyl - N - [2 - (2 - phenylbicyclo - (2,2,1)-heptyl)]-carbamate-methylsulfate (200 mg.) is dissolved in sterile physiological sodium chloride solution (1000 ml.). The solution is utilized in 1000 1-ml. ampules, which must be sterilised once more before use.

What is claimed is:
1. A carbamate of the formula

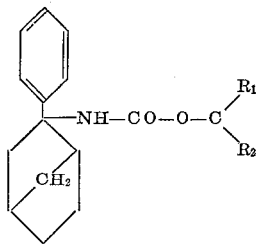

salts thereof formed with a physiologically compatible acid, and quaternary ammonium derivatives thereof, wherein $R_1$, taken alone, is

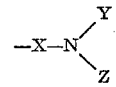

X is methylene or ethylene; Y and Z are lower alkyl; $R_2$, taken alone, is hydrogen; and $R_1$ and $R_2$, taken together with the nitrogen atom to which they are attached, represent a nitrogen heterocycle selected from the group consisting of N-methyl-piperidyl, N-benzyl-4-piperidyl, and 3-chinuclidyl.

2. 2-dimethylaminoethyl - N - [2 - (2 - phenylbicyclo-(2,2,1)-heptyl)]carbamate.
3. 3 - diethylaminopropyl - N - [2 - (2 - phenylbicyclo-(2,2,1)-heptyl)]-carbamate.
4. N - methyl - 3 - piperidyl - N - [2-(2-phenylbicyclo-(2,2,1) heptyl)]-carbamate.
5. N - methyl - 4 - piperidyl - N - [2-(2-phenylbicyclo-(2,2,1)-heptyl)]-carbamate.
6. N - benzyl - 4 - piperidyl - N - [2-(2-phenylbicyclo-(2,2,1)-heptyl)]-carbamate.
7. N - methyl - 4 - piperidyl - N - [2-(2-phenylbicyclo-(2,2,1)-heptyl)]-carbamate-methylsulfate.
8. 3 - chinuclidyl - N - [2 - (2 - phenylbicyclo-(2,2,1)-heptyl)]-carbamate.
9. 3 - chinuclidyl - N - [2 - (2 - phenylbicyclo-(2,2,1)-heptyl)]-carbamate-methylsulfate.

References Cited

FOREIGN PATENTS 1,558,512    2/1969    France  _____ 260—293.51

OTHER REFERENCES

Cram et al.: "Organic Chemistry," 2nd ed., McGraw-Hill Book Co., New York (1964), p. 491.

Smith: "The Curtius Reaction," Chapter 9 of "Organic Reactions, Volume III," (Adams et al., editors), John Wiley & Sons, Inc., New York (1946), pp. 337–449.

HENRY R. JILES, Primary Examiner

G. T. TODD, Assistant Examiner

U.S. Cl. X.R.

260—268 BC, 292, 293.56, 453 A, 472, 544 L; 424—250, 265, 267, 309